US012737612B2

(12) United States Patent
Pottier et al.

(10) Patent No.: US 12,737,612 B2
(45) Date of Patent: Sep. 15, 2026

(54) SYSTEM, DEVICES AND/OR PROCESSES FOR AUGMENTING ARTIFICIAL INTELLIGENCE AGENT AND COMPUTING DEVICES

(71) Applicant: Arm Limited, Cambridge (GB)

(72) Inventors: Remy Pottier, Grenoble (FR); Daren Croxford, Swaffham Prior (GB); Gary Dale Carpenter, Austin, TX (US)

(73) Assignee: Arm Limited, Cambridge (GB)

( * ) Notice: Subject to any disclaimer, the term of this patent is extended or adjusted under 35 U.S.C. 154(b) by 1096 days.

(21) Appl. No.: 17/337,317

(22) Filed: Jun. 2, 2021

(65) Prior Publication Data

US 2022/0391685 A1 Dec. 8, 2022

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
CPC .......... G06N 3/08; G06N 3/0895; G06N 3/09; G06N 3/091; G06N 3/092; G06N 3/094; G06N 3/096; G06N 3/098; G06N 3/0985; G06N 3/04; G06N 3/0464; G06N 3/0475; G06N 3/0495; G06N 3/0499; G06N 3/042; G06N 3/044; G06N 3/045; G06N 5/01; G06N 5/043; G06N 7/01; G06N 20/10; G06N 20/20; G06N 3/084
See application file for complete search history.

(56) References Cited

U.S. PATENT DOCUMENTS

2017/0099200 A1* 4/2017 Ellenbogen .......... G06V 10/764
2017/0124487 A1* 5/2017 Szeto .................. G06F 11/1448
2018/0240011 A1* 8/2018 Tan ........................... G06F 9/46
2018/0240043 A1* 8/2018 Majumdar .............. H04L 41/16
2018/0285767 A1* 10/2018 Chew ..................... G06N 20/00
2019/0114537 A1* 4/2019 Wesolowski ........... G06N 3/084
2020/0167652 A1* 5/2020 Huang ................... G06N 5/043
2020/0175419 A1* 6/2020 Bird .................... H04L 67/5681
2021/0299569 A1 9/2021 Civin et al.

(Continued)

OTHER PUBLICATIONS

B. Taylor, V. S. Marco, W. Wolff, Y. Elkhatib, and Z. Wang, "Adaptive deep learning model selection on embedded systems," in Proc. 19th ACM SIGPLAN/SIGBED Int. Conf. Lang. Compilers Tools Embedded Syst. (LCTES), 2018, pp. 31-43. (Year: 2018).*

(Continued)

*Primary Examiner* — Van C Mang
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more computing devices to enhance capabilities of peer devices. In an implementation, at least one agent to: identify one or more learnable capabilities enabled by one or more parameters that are accessible via receipt of one or more message at the one or more communication devices from one or more other computing devices; and determine a utility of augmenting at least one of the one or more learning engines with at least one of the one or more learnable capabilities.

20 Claims, 6 Drawing Sheets

(56) References Cited

U.S. PATENT DOCUMENTS

2022/0164662 A1 * 5/2022 Saki .................... H04W 4/027

OTHER PUBLICATIONS

M. Brambilla, M. Nicoli, G. Soatti and F. Deflorio, "Augmenting Vehicle Localization by Cooperative Sensing of the Driving Environment: Insight on Data Association in Urban Traffic Scenarios," in IEEE Transactions on Intelligent Transportation Systems, vol. 21, No. 4, pp. 1646-1663, Apr. 2020 (Year: 2020).*

Mass et al., "Proximal and Social-aware Device-to-Device Communication via Audio Detection on Cloud", 2014, MUM '14: Proceedings of the 13th International Conference on Mobile and Ubiquitous Multimedia, vol. 13 (2014), pp. 143-150 (Year: 2014).*

Chatzopoulos et al., "Have you asked your neighbors? A Hidden Market approach for device-to-device offloading", 2016, 2016 IEEE 17th International Symposium on A World of Wireless, Mobile and Multimedia Networks (WoWMoM), vol. 7 (2016), pp. 1-9 ( Year: 2016).*

Lin et al., "Two Timescale Hybrid Federated Learning with Cooperative D2D Local Model Aggregations", Mar. 18, 2021, arXiv, v1, pp. 1-38 (Year: 2021).*

Notification Concerning Transmittal of International Preliminary Report on Patentability, App. No. PCT/EP2022/025249, Mailed Dec. 14, 2023, 10 pages.

Savazzi, et al, "Opportunities of Federated Learning in Connected, Cooperative and Automated Industrial System," arXiv:2101.03367v2 [cs.LG] Jan. 12, 2021, 10 pages.

Wang, et al, "Convergence of Edge Computing and Deep Learning: A Comprehensive Survey," arXiv:1907.08349v3 [cs.NI] Jan. 28, 2020, 36 pages.

Notification of Transmittal of the International Search Report and the Written Opinion of the International Searching Authority, or Declaration, App. No. PCT/EP2022/025249, Mailed Sep. 27, 2022, 17 pages.

Savazzi, et al, "Opportunities of Federated Learning in Connected, Cooperative and Automated Industrial Systems," arXiv:2101.03367v1 [cs.LG], Jan. 9, 2021, 7 pages.

Wang, et al, "Convergence of Edge Computing and Deep Learning: A Comprehensive Survey," IEEE Communications Surveys & Tutorials, vol. 22 No. 2, Second Quarter 2020, Jan. 30, 2020, 36 pages.

Giancaterino, "An Introduction to Transfer Learning and HuggingFace," Apr. 19, 2020, retrieved Sep. 18, 2021, https://datasciencemilan.medium.com/an-introduction-to-transfer-learning-and-huggingface-cce345a97192, 6 Pages.

Donges, "What is Transfer Learning? Exploring the Popular Deep Learning Approach.," Jun. 16, 2019, Updated Aug. 12, 2021, retrieved Sep. 18, 2021, https://builtin.com/data-science/transfer-learning, 13 Pages.

Ruder, "Transfer Learning-Machine Learning's Next Frontier," Mar. 21, 2017, retrieved Sep. 1, 2021, https://ruder.io/transfer-learning/, 32 Pages.

Wikipedia, "Transfer learning," Edited Aug. 8, 2021, retrieved Sep. 18, 2021, https://en.wikipedia.org/wiki/Transfer_learning, 5 Pages.

* cited by examiner

300 identifying one or more learnable capabilities implementable on a first computing device, the one or more learnable capabilities to be enabled by one or more parameters that are accessible via receipt of one or more message at the first computing device from one or more second computing devices, the identified one or more learnable capabilities having been learned by at least one of the one or more second computing devices based, at least in part, on sensor observations obtained from a current location of the first computing device

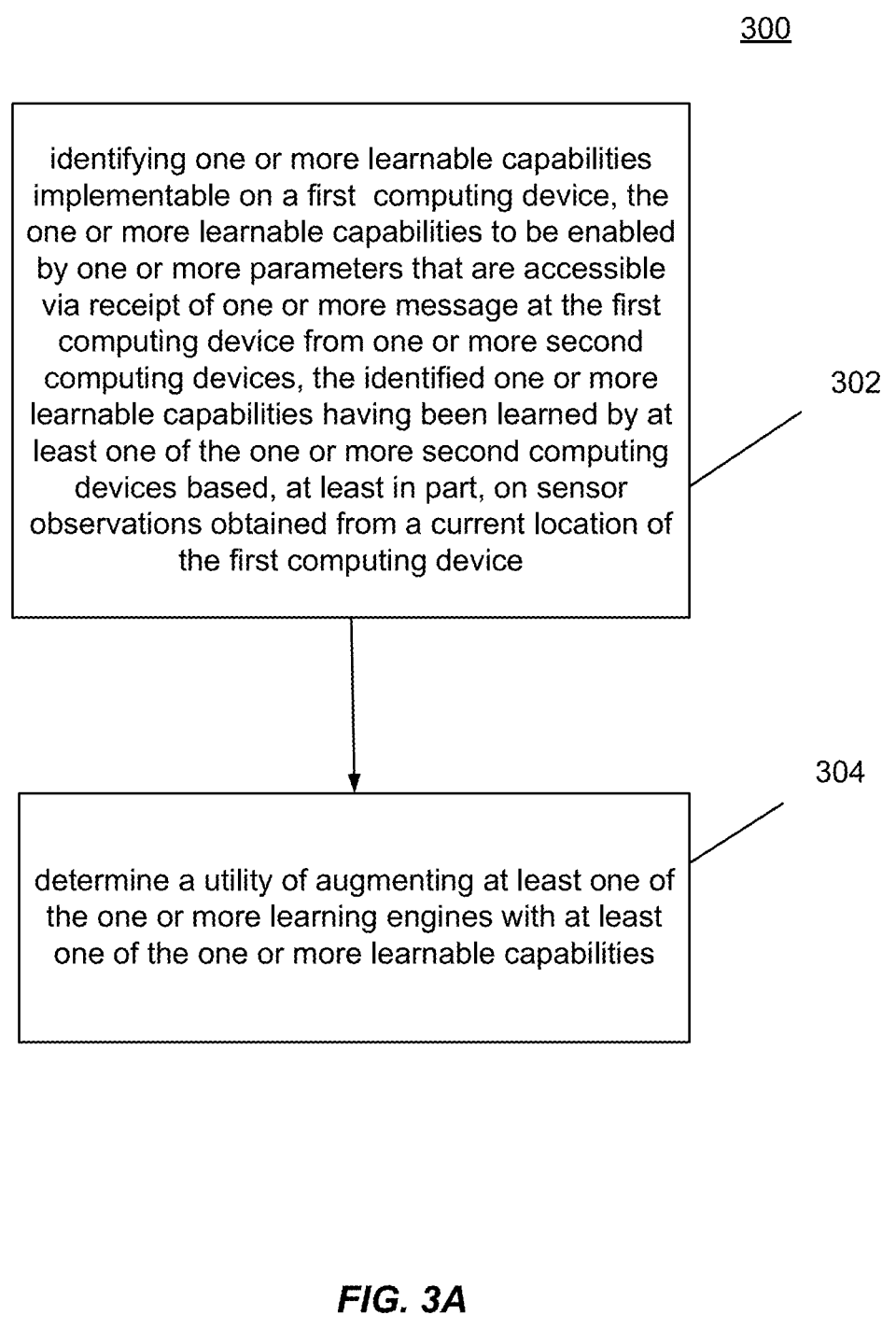

302

304 determine a utility of augmenting at least one of the one or more learning engines with at least one of the one or more learnable capabilities

*FIG. 3A*

370 maintaining a configuration of computing resources to impart one or more learnable capabilities to a first computing device, the learnable capabilities having been learned by one or more computing devices based, at least in part on sensor observations obtained by at least one of the one or more computing devices while present at a location

372 transmitting one or more messages to a second computing device that is proximate to the location, the one or more messages to identify at least one of the one or more learnable capabilities

SYSTEM, DEVICES AND/OR PROCESSES FOR AUGMENTING ARTIFICIAL INTELLIGENCE AGENT AND COMPUTING DEVICES

BACKGROUND

1. Field

The present disclosure relates generally to implementation of computing resources available to enable augmentation of capabilities of intelligent computing devices.

2. Information

Computing devices, such as smart phones, virtual reality devices, augmented reality devices and/or mixed reality devices, robots, industrial equipment, and/or any others computing devices, typically have limited computing resources such as, for example, processors, memory and/or stored energy resources. Such mobile computing devices may implement capabilities that may be enhanced using intelligent processes such as, for example, certain machine-learning techniques. While such machine-learning technique may enhance capabilities of mobile computing devices, such machine-learning techniques typically consume limited computing resources.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

FIG. 3A is a flow diagram of a process to expand and/or augment capabilities of a device, according to an embodiment;

FIG. 3C is a flow diagram of a process to identify learnable capabilities, according to an embodiment.

Figure 1:
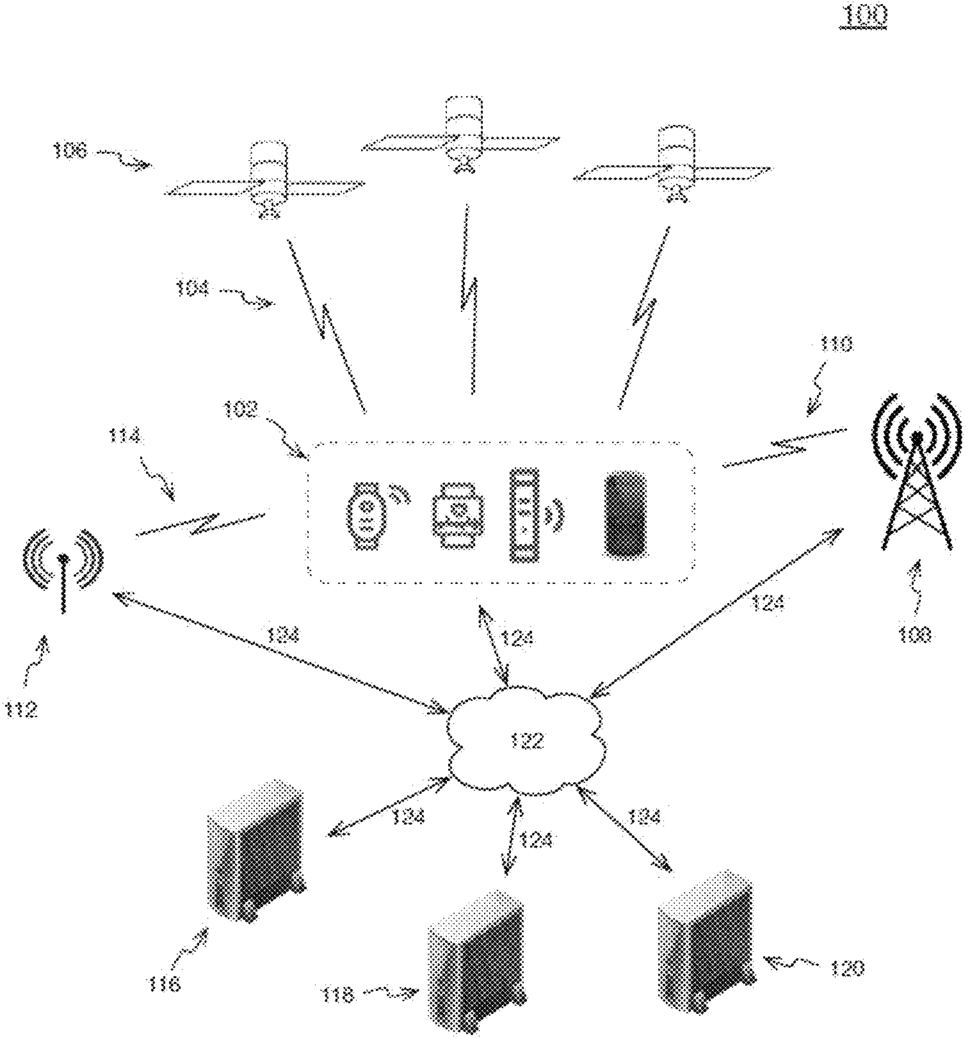
FIG. 1 is a schematic diagram illustrating features associated with an implementation of an example operating environment according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

As pointed out above, computing devices may implement capabilities that may be enhanced using intelligent processes such as, for example, certain machine-learning techniques. For example, such computing devices may deploy computing resources (e.g., processor, memory and/or stored energy resources) to expand and/or augment existing capabilities to, for example, better adapt certain computing functions to a particular environment. It should be understood, however that such physical computing resources in a device may be allocatable to different computing tasks (including real-time tasks to execute existing processes enabling current capabilities) may be limited.

In this context, an "acting engine" as referred to herein means a configuration of processing resources capable of executing one or more computing tasks to achieve a result. In a particular implementation, an acting engine may execute computer-readable instructions to process signals generated by one or more sensors, and provide control signals to one or more electrical, mechanical, chemical and/or biological actuators. In a particular implementation, such an active engine may execute in real-time as part of a closed-loop control system. It should be understood, however, that these are merely examples of an acting engine, and claimed subject matter is not limited in this respect.

According to an embodiment an acting engine may be structured and/or based on one or more computing models defined at least in part by encoded algorithms and/or numerical parameters (e.g., coefficients or weights). Such algorithms and/or numerical parameters may evolve over time to, for example, adapt to changes in an environment (e.g., an environment with which an active engine is to interact through sensors and/or actuators) and/or to incorporate available improvements (e.g., reduced cost, improved performance, lower energy usage, lower memory footprint/usage, reduced computation requirements, increased accuracy and/or new functional capabilities). In a particular implementation, encoded algorithms and/or parameters of an acting engine may be modified and/or adapted by a separate processing entity such as a learning engine.

In this context, a "learning engine" as referred to herein means a configuration of processing resources capable of effecting changes in a processing paradigm based, at least in part, on a history of conditions and/or events. For example, a learning engine may affect one or more aspects of an acting engine in executing computing tasks to achieve a result. In an embodiment, a learning engine may be characterized, at least in part, by a library of learning models such as, for example, adaptable computational learning models (e.g., artificial intelligence models). Such adaptable computational models may be implemented, at least in part, by specific learning constructs such as machine-learning, convolutional neural networks (CNNs), time-domain filtering, frequency domain filtering or Bayesian inference determination, or combinations thereof, just to provide a few examples. In an implementation, a learning engine may be further characterized by particular parameters (e.g., numerical values) that affect behavior of and/or further characterize execution of adaptable computational learning models. Such particular parameters may include, for example, neural network architecture, neural network weights and/or bias values, stimulus values for training (e.g., labeled images for supervised training) time-domain filter coefficients, spectral-domain filter coefficients, just to provide a few examples. In a particular implementation, such stimulus values for training may comprise parameter sets specifically to be processed in training operations and parameter sets specifically to be used in testing/validation.

According to an embodiment, a learning engine hosted on a computing device may enable a framework by which current capabilities may be augmented by and/or combined with capabilities of other devices such as peer devices. For example, such a learning engine may assess a utility incorporating aspects of learnable capabilities of such other devices relative to established learning goals. In a particular implementation, a learning engine may inquire regarding an availability of learnable capabilities that may be obtained from current capabilities of one or more local devices, and determine a utility of incorporating aspects of such learnable capabilities relative to learning goals and a cost associated with incorporating such aspects.

In an embodiment, adaptable computational learning models and/or particular parameters characterizing a learning engine may enable certain learnable capabilities associated with particular processing objectives and/or missions. Such a learnable capability may comprise capabilities in connection with, for example, natural language processing, medical diagnosis, financial transaction execution/processing, robot control, remote sensing, image recognition just to provide a few examples. According to an embodiment, learnable capabilities to be enabled by adaptable computational learning models and/or associated parameters of a learning engine may be augmented to, for example, adapt an acting engine to perform different computing tasks to achieve different results, to improve performance and/or reduce cost.

According to an embodiment, capabilities of a learning engine may be augmented by, for example, incorporation of additional and/or modified adaptable computational models and/or incorporation of additional and/or numerical parameters. In a particular implementation, a learning engine may employ computational resources to execute machine-learning and/or closed-loop feedback optimization (e.g., according to a loss or cost function) to organically change, modify and/or create adaptable computational models. Additionally, a learning engine may employ computational resources to execute machine-learning and/or closed-loop feedback optimization to organically change, modify and/or create particular parameters (e.g., numerical values) that affect behavior of existing and/or updated adaptable computational models. As pointed out above, augmenting capabilities of a learning engine organically (e.g., solely from machine-learning and/or closed-loop feedback optimization) may consume computational resources such as processor, memory and/or energy resources, for example. Additionally, obtaining full effectiveness augmented capabilities may be delayed as such full effectiveness may not be achieved until multiple iterations of execution of related learning models are completed. Also, effectiveness of such an organic augmentation learning engine capabilities may be inherently limited in that it may be impossible to achieve certain capabilities using an organic augmentation alone.

According to an embodiment, a computing device may host at least one agent comprising a learning engine with certain inherent learning capabilities. The at least one agent may be adaptable to identify one or more learnable capabilities of one or more other computing devices, and determine a utility of augmenting the learning engine with at least one of the one or more identified learnable capabilities. In a particular example implementation, the at least one agent may identify learnable capabilities that may be incorporated to augment and/or combine with existing capabilities (e.g., by augmentation of current learnable capability of a learning engine and/or incorporation of new learnable capabilities). The at least one agent may identify the learnable capabilities based, at least in part, on one or more parameters that are accessible via receipt of one or more messages from one or more other computing devices. The at least one agent may then determine a utility of augmenting at least one of the one or more existing learning engines with at least one of the one or more identified learnable capabilities. Based, at least in part, on a determined utility of augmenting a learning engine with one or more learnable capabilities, the at least one agent may determine whether resources are to be allocated to augment the learning engine, and/or determine a particular technique to augment the learning engine.

As may be appreciated, features described herein may enhance and/or enable transferability and/or transportability of learned intelligence between and/or among entities and/or intelligent devices. Observations collected by sensor devices integrated with a computing device may enable such a computing device to learn and/or be trained from its immediate physical environment. Enhanced transferability and/or transportability of learned intelligence between and/or among peer devices located in a common physical environment may further expand and/or enable approaches for devices to acquire intelligence from its immediate physical environment. Such transferability and/or transportability of acquired intelligence between and/or among peer devices may reduce any need to obtain intelligence from a human operator, and/or a remote and/or cloud-based server, and thereby may increase and/or enhance device autonomy and security.

Increased and/or enhanced device autonomy enabled by transferability and/or transportability of the acquired intelligence between and/or among peer devices may further enable autonomous devices to "travel to learn." Here, such devices may travel to different locations to learn not only from sensor observations, but from intelligent devices in these different locations (e.g., without communication with a remote and/or cloud-based server, and/or without human intervention). Learnable capabilities transferred and/or transported to such a travelling autonomous device may be combined with existing capabilities as part of accumulated knowledge and/or capabilities.

Additionally, such increased and/or enhanced device autonomy enabled by transferability and/or transportability of the acquired intelligence may enable multiple three or more devices to establish a community of devices having collective learned capabilities and/or a "culture" based on and/or enabled by the collective learned capabilities. Here, learnable capabilities acquired by one device in a community of devices may be transferred and/or transported to one or more other devices in the community. In a particular scenario, learnable capabilities acquired by a first device in a community of devices (e.g., in part from observations obtained by sensors) may be transferred and/or transported to a second device in the community of devices. The second device may in turn transfer and/or transport learnable capabilities obtained from the first device to a third device in the community of devices.

Additionally, collectively learned capabilities among a community of devices (e.g., a community of robotic devices) may autonomously establish specializations of functions among devices in the community of devices. Such a specializations may include, for example, manufacture of goods on an assembly line, testing manufactured goods and/or repairing other devices in the community of devices.

FIG. 1 is a schematic diagram illustrating features associated with an implementation of an example operating environment 100 capable of facilitating and/or supporting one or more operations and/or techniques for augmenting capabilities of intelligent computing devices such as intelligent computing devices. Intelligent computing devices may include a wide variety of stationary and/or mobile devices, such as, for example, automobile sensors, biochip transponders, heart monitoring implants, kitchen appliances, locks or like fastening devices, solar panel arrays, home gateways, smart gauges, robots, financial trading platforms, smart telephones, cellular telephones, security cameras, wearable devices, thermostats, Global Positioning System (GPS) transceivers, augmented/extended reality systems/devices (e.g., headsets), brain-computer interface devices, personal digital assistants (PDAs), virtual assistants, laptop computers, personal entertainment systems, tablet personal computers (PCs), PCs, personal audio or video devices, personal navigation devices, or the like.

It should be appreciated that operating environment 100 is described herein as a non-limiting example that may be implemented, in whole or in part, in the context of various wired or wireless communications networks, or any suitable portion and/or combination of such networks. For example, these or like networks may include one or more public networks (e.g., the Internet, the World Wide Web), private networks (e.g., intranets), wireless wide area networks (WWAN) (e.g., cellular networks), wireless local area networks (WLAN, etc.) (e.g., Wi-Fi networks), wireless personal area networks (WPAN), telephone networks, cable television networks, Internet access networks, fiber-optic communication networks, waveguide communication networks, or the like. It should also be noted that claimed subject matter is not limited to a particular network and/or operating environment.

According to an embodiment, intelligent computing devices 102 may comprise location awareness capabilities (awareness of location relative to a geographical point of reference such as Earth-centered coordinates, street address, etc. or relative to a location of a peer device (e.g., proximity). Thus, as illustrated, in an implementation, an intelligent computing device 102, such as an IoT-type device, for example, may receive and/or acquire satellite positioning system (SPS) signals 104 from SPS satellites 106. In some instances, SPS satellites 106 may be from a single global navigation satellite system (GNSS), such as the GPS, Glonass, BeiDou or Galileo satellite systems, for example. It should be understood, however, that these are merely examples of systems that may be utilized to obtain estimated location of an intelligent computing device 102, and that claimed subject matter is not limited in this respect.

At times, one or more intelligent computing devices 102 may, for example, transmit wireless signals to, or receive wireless signals from, a suitable wireless communication network. In one example, one or more intelligent computing devices 102 may communicate with a cellular communication network, such as by transmitting wireless signals to, or receiving wireless signals from, one or more wireless transmitters capable of transmitting and/or receiving wireless signals, such as a base station transceiver 108 over a wireless communication link 110, for example. Similarly, one or more intelligent computing devices 102 may transmit wireless signals to, or receive wireless signals from a local transceiver 112 over a wireless communication link 114. Base station transceiver 108, local transceiver 112, etc. may be of the same or similar type, for example, or may represent different types of devices, such as access points, radio beacons, cellular base stations, femtocells, an access transceiver device, or the like, depending on an implementation. Similarly, local transceiver 112 may comprise, for example, a wireless transmitter and/or receiver capable of transmitting and/or receiving wireless signals. For example, at times, wireless transceiver 112 may be capable of transmitting and/or receiving wireless signals from one or more other terrestrial transmitters and/or receivers.

In a particular implementation, local transceiver 112 may, for example, be capable of communicating with one or more intelligent computing devices 102 at a shorter range over wireless communication link 114 than at a range established via base station transceiver 108 over wireless communication link 110. For example, local transceiver 112 may be positioned in an indoor or like environment, and may provide access to a wireless local area network (WLAN, e.g., IEEE Std. 802.11 network, etc.) or wireless personal area network (WPAN, e.g., Bluetooth® network, etc.). Again, it should be understood that these are merely examples of networks that may communicate with one or more intelligent computing devices 102 over a wireless link, and claimed subject matter is not limited in this respect.

In an implementation, one or more intelligent computing devices 102, base station transceiver 108, local transceiver 112, etc. may, for example, communicate with one or more servers, referenced herein at 116, 118, and 120, over a network 122, such as via one or more communication links 124. Network 122 may comprise, for example, any combination of wired or wireless communication links. In a particular implementation, network 122 may comprise, for example, Internet Protocol (IP)-type infrastructure capable of facilitating or supporting communication between one or more intelligent computing devices 102 and one or more servers 116, 118, 120, etc. via local transceiver 112, base station transceiver 108, directly, etc. In another implementation, network 122 may comprise, for example, cellular communication network infrastructure, such as a base station controller or master switching center to facilitate and/or support mobile cellular communication with one or more intelligent computing devices 102. Servers 116, 118, and/or 120 may comprise any suitable servers or combination thereof capable of facilitating or supporting one or more operations and/or techniques discussed herein. For example, servers 116, 118, and/or 120 may comprise one or more content servers, simulation servers, update servers, back-end servers, management servers, archive servers, location servers, positioning assistance servers, navigation servers, map servers, crowdsourcing servers, network-related servers, or the like.

In particular implementations, an intelligent computing device 102 may have circuitry and/or processing resources capable of determining a position fix or estimated location of the intelligent computing devices 102. For example, if satellite signals 104 are available, an intelligent computing device 102 may compute a position fix based, at least in part, on pseudorange measurements to four or more SPS satellites 106. Here, an intelligent computing device 102 may, for example, compute such pseudorange measurements based, at least in part, on pseudonoise code phase detections in signals 104 acquired from four or more SPS satellites 106.

Figure 2:
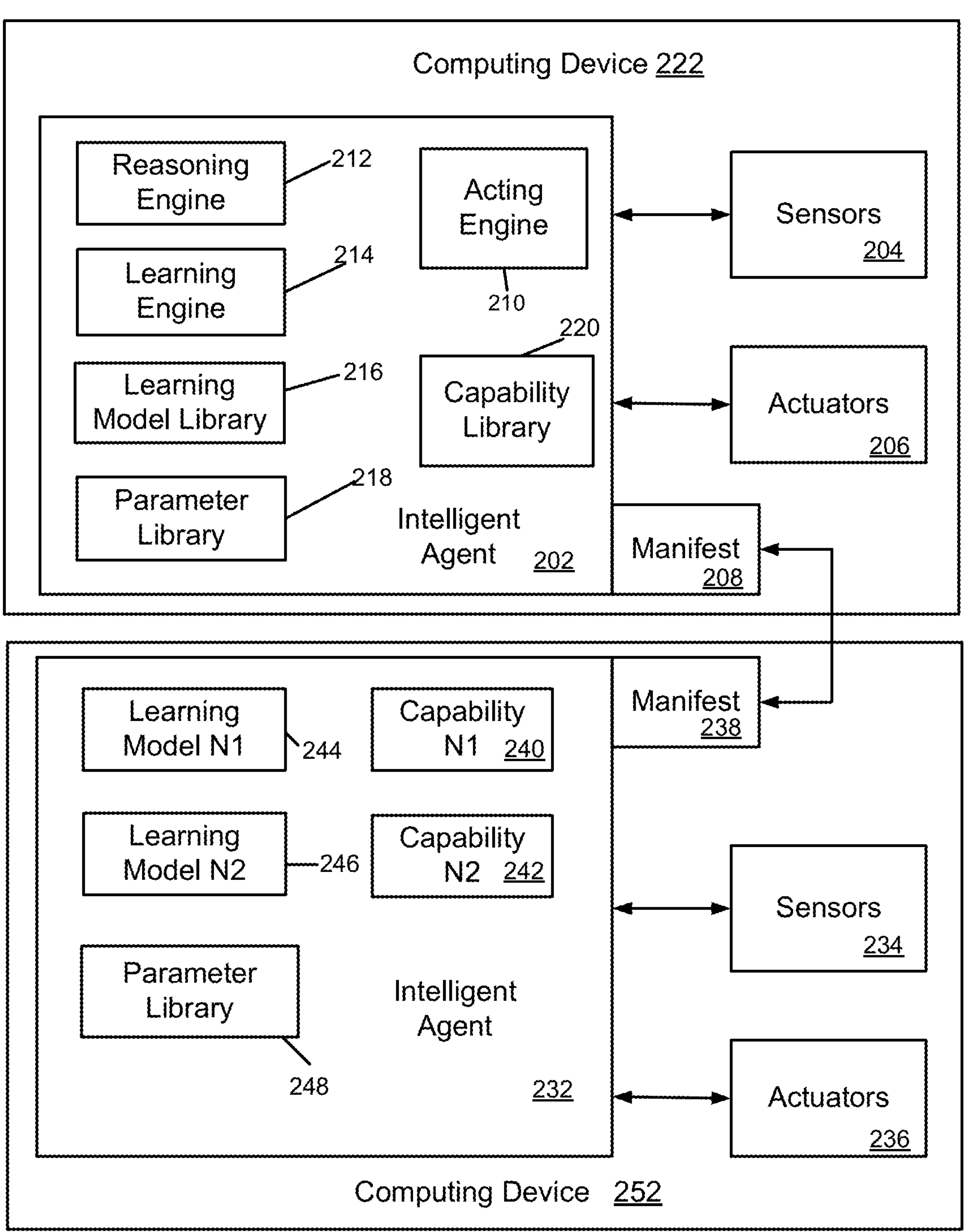
FIG. 2 is a schematic diagram of an operating environment including peer intelligent computing devices, according to an embodiment.

FIG. 2 is a schematic diagram illustrating features associated with an implementation of an example operating environment capable of facilitating and/or supporting one or more operations and/or techniques for augmenting capabilities of intelligent computing devices such as computing device 222. In a particular implementation, computing device 222 and computing device 252 may be implemented as intelligent computing devices 102, illustrated generally herein at FIG. 2. In a particular operational implementation, computing device 222 may comprise mobile computing device (although claimed subject matter is not limited to such an operational implementation). According to an embodiment, computing device 222 and computing device 252 may comprise computing resources (not shown) such as, for example, processors, memory, power sources (e.g., battery) and/or communication devices for receiving messages from and/or transmitting messages to physical transmission media and/or power sources.

Computing device 222 may host an intelligent agent 202 comprising an acting engine 210 to control execution of one or more computing tasks to achieve a result. In a particular implementation, acting engine 210 may execute computer-readable instructions to process signals generated by sensors 204. In particular implementations, sensors 204 may comprise input devices such as, for example, image sensors, microphones, keyboards or an eye tracker, just to provide a few examples of input devices implemented as sensors. Acting engine 210 may also provide control signals to actuators 206 comprising one or more electrical, mechanical, chemical and/or biological actuators. Actuators 206 may also comprise output devices such as, for example, a display or speaker to control and/or provide output signals. In a particular implementation, active engine 210 may execute in real-time as part of a closed-loop control system (e.g., including sensors 206 and actuators 206). It should be understood, however, that these are merely examples of how acting engine 210 may utilize signals generated by sensors 204 and provide signals to actuators 206, and claimed subject matter is not limited in this respect.

According to an embodiment, acting engine 210 may execute computing tasks using particular functions that emulate cognitive abilities to learn and/or solve problems. For example, acting engine 210 may apply procedures to emulate reasoning that may be learned from new information and/or stimuli to make decisions without direct instruction (e.g., instruction from a human programmer). In a particular implementation, acting engine 210 may employ neural networks to facilitate deep learning, for example.

According to an embodiment, an inventory of current capabilities of acting agent 210 may be maintained and/or recorded in capability library 220. Such current capabilities of acting engine 210 may comprise particular executable procedures to perform specific associated tasks. Execution of such particular executable procedures may be facilitated, at least in part, by particular parameters maintained in parameter library 218, for example. Parameter library 218 may store, for example, weights, coefficients and/or other numerical parameters to further define/determine behavior of executable procedures maintained by capability library 220. While current capabilities of acting agent 210 (e.g., enabled by capabilities maintained and/or recorded capability library 220 and/or parameter library 218) may provide a robust framework for certain activities (e.g., emulating particular cognitive abilities such as natural language processing), such capabilities of acting engine 210 may be fairly limited for other activities (e.g., emulating other particular cognitive abilities such as trading financial instruments on an exchange or image recognition).

According to an embodiment, a neural network may comprise a graph comprising nodes to model neurons in a brain. Edges in a neural network connecting nodes may model synapses capable of transmitting signals (e.g., represented by real number values) between neurons. Receiving such a signal at a node in a neural network, the node may perform some computation to generate an output signal (e.g., to be provided to another node in the neural network connected by an edge) based, at least in part, on one or more "weights" and/or numerical coefficients associated with the node and/or edges connecting the node to other nodes. In a particular implementation, such weights and/or numerical coefficients may be adjusted and/or updated as learning progresses. For example, such a weight may increase or decrease a strength of an output signal. In an implementation, transmission of an output signal from a node in a neural network may be inhibited if a strength of the output signal does not exceed a threshold value.

According to an embodiment, a neural network may be structured in layers such that a node in a particular neural network layer may receive output signals from one or more nodes in a previous layer in the neural network, and provide an output signal to one or more nodes in a subsequent layer in the neural network. One specific class of layered neural networks may comprise a convolutional neural network (CNN) or space invariant artificial neural networks (SIANN) that enable deep learning. Such CNNs and/or SIANNs may be based on a shared-weight architecture of a convolution kernels that shift over input features and provide translation equivariant responses. Such CNNs and/or SIANNs may be applied to image and/or video recognition, recommender systems, image classification, image segmentation, medical image analysis, natural language processing, brain-computer interfaces, financial time series, just to provide a few examples.

According to an embodiment, capabilities maintained and/or recorded in capability library 220 may be enabled/facilitated by specific learning models maintained in and/or defined by learning model library 216. Particular learning models maintained in and/or defined by learning model library 216 may include, for example, deep learning (e.g., CNN and/or recurrent neural network (RNN) models), Naïve Bayes, linear regression, logistic regression, K-Nearest-Neighbor (KNN), decision tree, support vector machine (SVM), random forest, classification and regression tree (CART), a priori machine learning, principal component analysis (PCA), hierarchical clustering, back propagation or gradient boosting, or any combination thereof, just to provide a few examples of learning models. According to an embodiment, a capability of acting engine 210 may be defined, at least in part, by an implementation of one or more learning models defined in learning model library 216 (e.g., particular structures of a CNN) in combination with associated parameters maintained in parameter library 218 (e.g., weights to be applied to nodes of a particular structure of a CNN).

According to an embodiment, capabilities maintained and/or recorded in capability library 220 may in part be limited by an availability of particular learning models maintained in and/or defined by learning model library 216, and/or an availability of particular parameters maintained in parameter library 218. Such a limited availability of particular learning models and/or related parameters may, in turn, limit capabilities of acting engine 210. Nonetheless, augmentation of learning models maintained in learning model library 216 and/or parameters maintained in parameter library 218 may enable an augmentation of capabilities maintained and/or recorded in capability library 220. For example, learning models maintained in learning model library 216 and/or parameters maintained in parameter library 218 may be augmented organically overtime in training operations through iterations of acting engine 210, for example. In a particular implementation, acting engine 210 may execute iterations of adaptive learning operations (e.g., machine-learning procedures) that, over time, augment models maintained in learning model library 216 and/or parameters maintained in parameter library 218 to augment capabilities available in capability library 220. According to an embodiment, such an iteration of adaptive learning operations may consume computing resources (e.g., processor, power, memory) while acting engine 210 executes to, at least in part, augment available learning models in learning library model and/or available related parameters.

According to an embodiment, learnable capabilities maintained and/or recorded in capability library 220 may be augmented, at least in part, based on learnable capabilities currently available to processes of intelligent agent 232 hosted by computing device 252. In an implementation, computing device 252 may comprise multiple learnable capabilities N1 and N2 that may be adapted for application to specific aspects/characteristics of operating environment 200. For example, learning models N1 and/or N2, and parameters maintained in parameters library 248 (e.g., enabling capabilities N1 and N2) may have been developed over iterations of adaptive learning operations in the course of interactions of computing device 252 with operating environment 200 through sensors 234 and/or actuators 236. Alternatively, learning models N1 and N2, and parameters maintained in parameters library 248 may at least in part be externally programmed a priori. In a particular implementation, learnable capabilities maintained and/or recorded in capability library 220 by obtaining associated learning models (e.g., learning model N1 and/or learning model N2) and/or associated parameters (e.g., maintained in parameter library 248).

According to an embodiment, computing device 222 and computing device 252 may comprise communication devices (e.g., transmitter devices and/or receiver devices, not shown) capable of transmitting messages to and/or receiving messages from a physical transmission medium. In one particular implementation, such communication devices may support one or more higher layer communication protocols such as manifest 208 and manifest 238. Manifest 208 and manifest 238 may, at least in part, define a protocol by which computing device 222 may augment learnable capabilities defined in capability library 220 based, at least in part, on aspects of capability N1 and/or capability N2. For example, manifest 208 and manifest 238 may facilitate transmission of messages between computing device 222 and computing device 252 to communicate features of learning model N1 and/or learning model N2, and/or related parameters maintained in parameter library 248 to computing device 222. According to an embodiment, manifest 208 and manifest 238 may be defined according to a common semantic language enabling intelligent agent 202 to express a "willingness" to learn and enabling intelligent agent 232 to express an ability/willingness to train/teach. For example, through transmission of one or more messages, manifest 208 may enable intelligent agent 202 to indicate specific learnable capabilities determined to be in support of one or more learning goals according to the common semantic language. Similarly, through transmission of one or more messages, manifest 238 may enable intelligent agent 232 to express particular capabilities that may be learnable by intelligent agent 202.

Figure 3B:
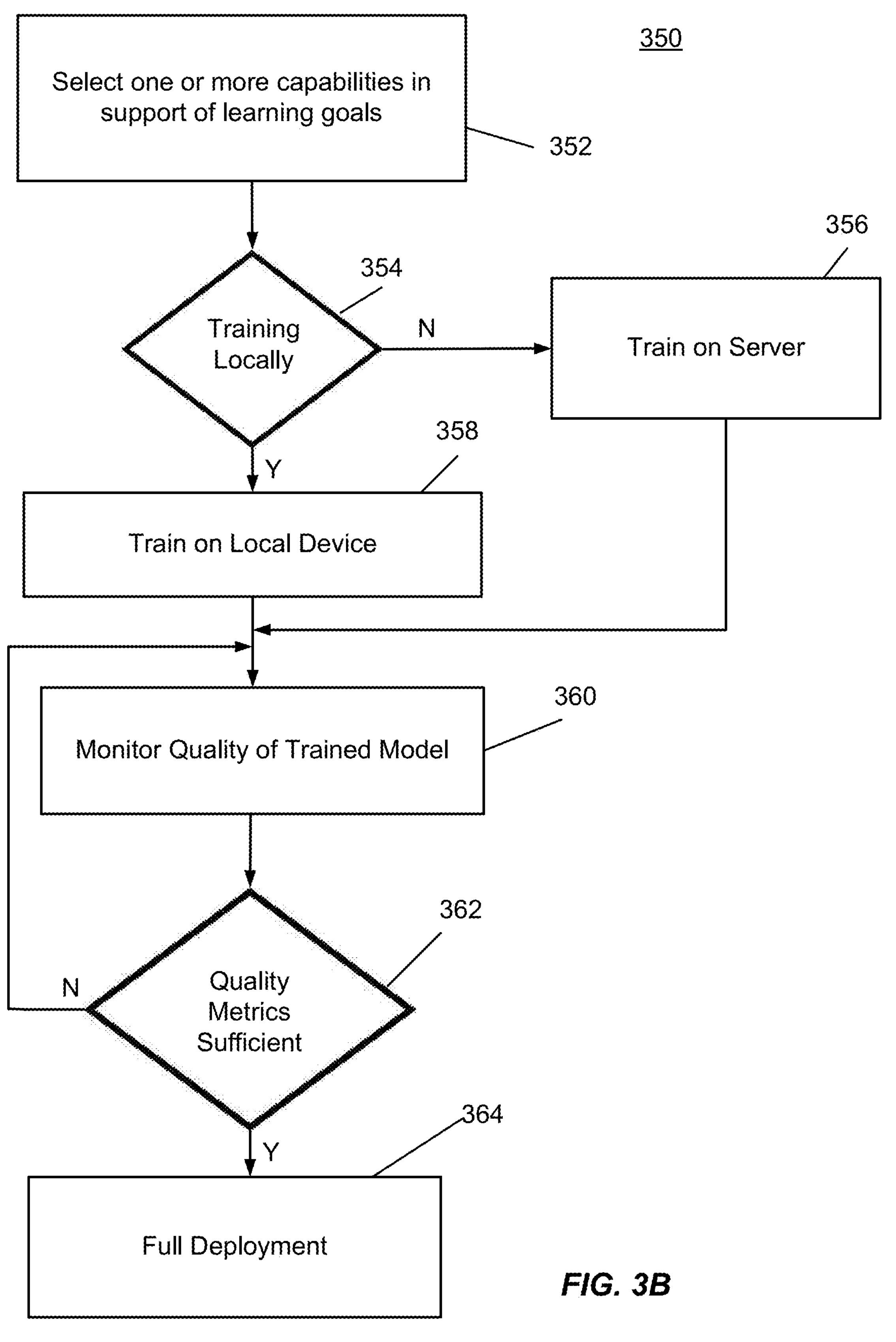
FIG. 3B is a flow diagram of a process to transition applicability of learned capabilities, according to an embodiment.
Figure 3C:
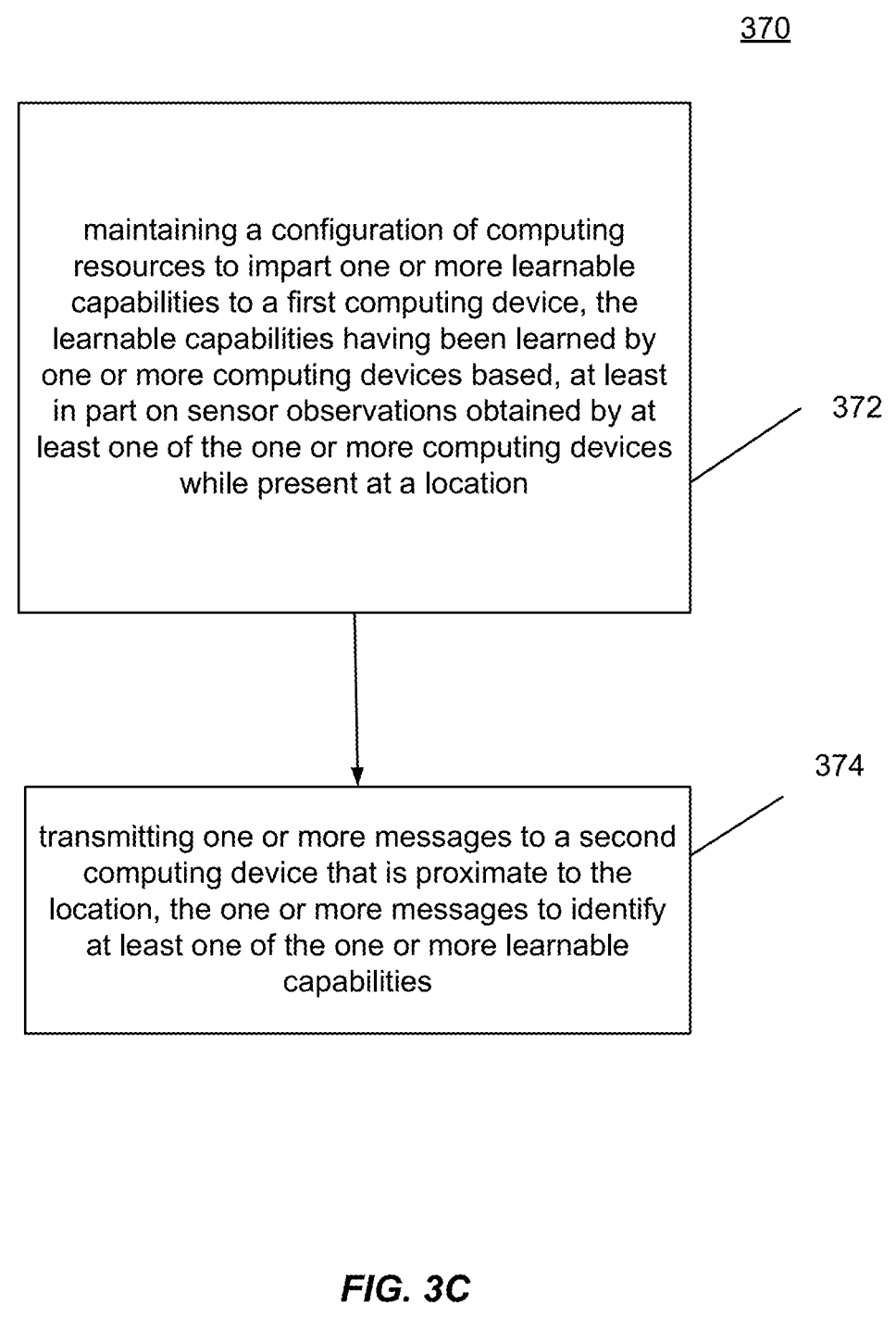

FIG. 3A is a flow diagram of a process 300 to be implemented by a computing device (e.g., computing device 222) to augment learnable capabilities based, at least in part, on learnable capabilities of a peer device (e.g., computing device 252). FIG. 3B is as flow diagram of a process 370 to be implemented by a computing device (e.g., computing device 252) to transmit messages identifying one or more learnable capabilities maintained by the computing device. Block 302 may comprise an identification of learnable capabilities enabled by a different computing device. For example, such identified learnable capabilities may be maintained at such a different computing device according to block 372. In particular implementation, block 302 may identify such learnable capabilities based, at least in part, on receipt of one or more messages transmitted at block 374. According to an embodiment, computing device 222 may identify other computing devices (e.g., computing device 252) locally present in operating environment 200. For example, computing device 222 may have a capability to determine its location to be in operating environment 200, and a priori store a list of other computing devices (e.g., stationary computing devices) that are similarly located in operating environment 200.

In a particular implementation, learnable capabilities identified at block 302 may have been learned by one or more other computer devices (e.g., peer computing device 252) based at least in part, on sensor observations obtained from a current location. In one particular implementation, such sensor observations may have been obtained by a computing device providing the one or more messages that are received at block 302. In a particular example, computing device 252 may provide one or more messages (e.g., at block 374) to computing device 222 indicating learnable capabilities that were acquired by computing device 252 (and maintained at block 374) based, at least in part, on observations obtained via sensors 234. In an alternative example, such messages from computing device 252 (e.g., transmitted at block 374) may indicate learnable capabilities obtained via sensor observations obtained/acquired by a computing device (not shown) other than computing device 252.

Learnable capabilities acquired based on observations obtained at a current location of a mobile device by sensors (e.g., sensors 234) may obviate a need for transmission of messages between the mobile computing device and a remote and/or cloud-based server, or a need for human interaction with the mobile computing device. This may in turn enhance device security.

In another example, computing device 222 may have a capability to interrogate peer mobile devices (e.g., via messages transmitted in a peer-to-peer communication protocol and/or Internet Protocol at least partially over wireless communication links). As pointed out above, manifest 208 may enable transmission of one or more messages to express a willingness to learn additional capabilities (e.g., in support of one or more learning goals) while manifest 238 may enable transmission of messages to express particular capabilities. Responsive to an interrogation from computing device 222, manifest 238 may provide to manifest 208 (e.g., in one or more messages transmitted according a communication protocol) a description/characterization of learnable capabilities maintained by computing device 252 (e.g., capabilities N1 and/or N2). Such a description/characterization of learnable capabilities may comprise, for example, an identification of particular compute tasks, performance metrics, version number, date/time of creation, input signals/values (e.g., image pixel values, depth parameters, audio signals), output signals/values (e.g., segmentation parameters, imagine enhancement parameters, image pixel values), identification of particular underlying learning models and/or associated parameters. In a particular implementation, such a description/characterization of learnable capabilities may be descriptive and/or indicative of resource utilization and/or performance of a current implementation (e.g., number of parameters and/or depth of a neural network).

As pointed out above, computing device 222 may augment its learnable capabilities (e.g., maintained and/or recorded in capability library 220) using either of two different techniques: 1) organically through iterations of adaptive learning operations by acting engine 210; or 2) by obtaining learning models and/or associated parameters from a peer device (e.g., computing device 252). In selecting a particular technique to use in augmenting current capabilities maintained and/or recorded in capability library 220, an intelligent agent 202 may interrogate a reasoning engine 212 to, for example, assess a utility for such augmentation of learnable capabilities maintained and/or recorded in capability library 220.

According to an embodiment, reasoning engine 212 may establish learning goals based, at least in part, on a predetermined mission. Reasoning engine 212 may assess a utility of different alternative actions to meet such established learning goals. Such alternative actions to meet established learning goals may include, for example, learning new capabilities, augmenting existing capabilities, combining existing and/or new capabilities.

As pointed out above, one technique for augmenting existing capabilities may comprise execution of iterations of learning models maintained in learning model library 216 by acting engine 210 to, for example, update associated parameters (e.g., weights, coefficients and/or other numerical parameters) stored in parameter library 218. Also as pointed out above, one technique for incorporating a new capability may comprise obtaining capability N1 and/or capability N2 via receipt of one or more messages from computing device 252. For example, computing device 222 may obtain capability N1 at least in part by obtaining in a message (e.g., from computing device 252) parameters maintained in parameter library 248 enabling capability N1 (e.g., weights and/or coefficients). Additionally, computing device 222 may obtain capability N1 at least in part by obtaining in a received message features of learning model N1 (e.g., add neural network row, column and/or rule(s) to an existing CNN as expressed in learning model N1).

Relative to established learning goals, different techniques to augment current learnable capabilities (e.g., learnable capabilities maintained by capability library 220) may impart differing associated resulting utilities (e.g., reflecting an increased effectiveness in meeting learning goals established by reasoning engine 212). For example, there may be one quantifiable metric of utility in updating associated parameters stored in parameter library 218 (e.g., executing iterations of learning models in learning model library 216 by acting engine 210). Likewise, there may be another quantifiable metric of utility in obtaining capability N1 at least in part by obtaining in a message parameters maintained in parameter library 248 enabling capability N1 (e.g., weights and/or coefficients). Similarly, there may be yet another quantifiable metric of utility in obtaining capability N1 at least in part by obtaining, in a received message, features of learning model N1.

In particular implementations, aforementioned quantifiable metrics may be determined based, at least in part, on an expected improvement in performance in meeting learning goals from execution of a technique to augment one or more capabilities maintained in capability library 220 relative to an expected cost for such execution of the technique. Such an expected improvement in performance associated with execution of a technique may be characterized by any one or a combination of factors including reduction in latency, increase in accuracy and/or reliability, increase in measured output, expected reduction in consumption of computing resources, subjective factors, just to provide a few examples. Such an expected cost associated with execution of a technique may be characterized by any one of a combination of factors including use of computing resources (e.g., for iteration of acting engine 210), use of message communication resources (e.g., for receiving messages from computing device 252), payment of subscription fee, expected increase in consumption of computing resources, risk of security breach, just to provide a few examples.

According to an embodiment, learning engine 214 at block 304 may assess alternative techniques to augment one or more capabilities maintained and/or recorded in capability library 220, and select a particular alternative technique to augment such one or more capabilities having a highest associated utility. For example, block 304 may determine an associated utility metric for each different alternative technique for augmenting capabilities, and selecting a particular alternative technique having a highest associated utility.

According to an embodiment, learning engine 214 may interrogate reasoning engine 212 to, for example, characterize established learning goals. Block 304 may comprise an evaluation and/or comparison of at least one learning goal (e.g., as established by reasoning engine 212) with current capabilities (e.g., current capabilities as reflected in capability library 220). In determining a utility of augmenting current capabilities from incorporation of a particular alternative technique for augmenting current capabilities, block 304 may assess a marginal increase in effectiveness of acting engine 210 (e.g., in meeting established learning goals) by incorporation of the particular alternative technique.

Attempts to upgrade capabilities and/or incorporate new capabilities may impart varying degrees of risk in connection with maintaining security/privacy, and maintaining acceptable levels of performance and/or reliability. According to an embodiment, FIG. 3B shows a process 350 for managing such risk that may be performed by intelligent agent 202. Here block 352 may select one or more new or upgraded learnable capabilities that may be deployed to meet one or more established learning goals.

Diamond 354 may select a process of training a learning model (e.g., neural network) locally on a client device (e.g., computing device 222). In particular, diamond 354 may determine whether training for a new and/or upgraded capability (e.g., by determining CNN, architecture, weights and/or coefficients) is to occur locally on a client device (e.g., through execution of CPU, GPU and/or NPU on computing device 222) or by a server (e.g., CPU, GPU and/or NPU of server 116, 118 and/or 120). Here, diamond 354 may apply one or more factors to determine whether training is to occur locally on a client device (at block 358) or on a server device (e.g., at block 356) such as, for example, concerns of privacy/security (e.g., if there is a risk of beach of security with communication links to server and/or at the server), availability of computing resources at the client device to perform training.

In one particular implementation, a device furnishing a learning model (e.g., computing device 352 or server device) may allow a client device (e.g., computing device 222) the option of executing training operations locally at the client device or at a server device (e.g., a device furnishing the learning model). According to an embodiment, while local execution of training may consume scarce computing resources at a client device, block 354 may elect to execute training operations locally if privacy/security of transmitting training to a non-secure server and/or over non-secure communication links is of concern.

Following commencement of training (either locally at a client or a server), execution of an at least partially trained learning model may be monitored at block 360. For example, block 360 may monitor quality metrics of the at least partially trained model such as, for example, accuracy, reliability, speed, efficiency/economy, just to provide a few examples. In a particular implementation in which a learning model comprises a CNN, for example, block 360 simulate and inject at particular (e.g., random) nodes (e.g., at idle times). In an embodiment, the at least partially trained model may be at least partially deployed while block 360 monitors execution of the trained model. If diamond 362 determines that monitored quality metrics are sufficiently high for full deployment, full deployment may commence at block 364.

In an alternative to augmenting capabilities based, at least in part, on messages received from a peer device (e.g., computing device 252), computing device 222 may augment capabilities maintained in capability library 220 based, at least in part, on model features and/or related parameters in messages received from a remote server device (e.g., cloud-based service). According to an embodiment, a cloud-based service (e.g., implemented on one or more of servers 116, 118 and 120) may maintain different CNN configurations and/or associated CNN weights optimized for different location regions. In a particular implementation, upon entering a particular region, computing device 222 may obtain CNN configurations and/or associated CNN weights tailored to and/or optimized for the particular region from a cloud-based service. In one particular implementation, a location server (not shown) tracking a location of computing device 222 may detect entry to the particular region, and initiate automatic delivery of CNN configurations and/or associated CNN weights tailored to and/or optimized for the particular region from the cloud-based service. Alternatively, computing device 222, upon detection of entry into the particular region, may interrogate the cloud service to determine an availability at the cloud service of CNN configurations and/or associated CNN weights tailored to and/or optimized for the particular region. If such tailored/optimized CNN configurations and/or associated CNN weights are available, computing device 222 may receive such optimized CNN configurations and/or associated CNN weights in one or more messages.

In another embodiment, computing device 222 may characterize an environmental context of a current location of computing device 222, and request a CNN configuration and/or associated CNN weights that may be tailored to and/or optimized for such an environmental context. For example, computing device 222 may comprise environmental sensors such as, for example, light sensors, a heat sensor (e.g., thermometer), humidity sensor, RF receiver, barometric pressure sensor, just to provide a few examples of environmental sensors capable of obtaining observations of aspects of an immediate environment of computing device 222. In one particular implementation, computing device 222 may process raw observations obtained from environmental sensors to determine a characterization of an environmental context (e.g., night-time, day-time, indoors, outdoors, weather, density of RF transmitter devices, just to provide a few particular non-limiting examples of an environmental context), and transmit one or more messages to a cloud service comprising an indication of the characterization of the environmental context. In response, the cloud service may return one or more messages comprising a CNN configuration and/or associated CNN weights that may be tailored to and/or optimized for such a characterization of the environmental context.

Alternatively, computing device 222 may transmit one or more messages to a cloud service comprising raw environmental sensor observations. Receiving the raw environmental sensor observations, the cloud service may process the raw environmental sensor observations to characterize an environmental context of computing device 222, and transmit one or more messages to computing device 222 comprising a CNN configuration and/or associated CNN weights that may be tailored to and/or optimized for such a characterization of the environmental context determined by the cloud service.

In the context of the present patent application, the term "connection," the term "component" and/or similar terms are intended to be physical but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, particularly a wireless network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, "coupled" is also used to mean that two or more tangible components and/or the like are not necessarily tangibly in direct physical contact, but are able to co-operate, liaise, and/or interact, such as, for example, by being "optically coupled." Likewise, the term "coupled" is also understood to mean indirectly connected. It is further noted, in the context of the present patent application, since memory, such as a memory component and/or memory states, is intended to be non-transitory, the term physical, at least if used in relation to memory necessarily implies that such memory components and/or memory states, continuing with the example, are tangible.

Unless otherwise indicated, in the context of the present patent application, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, that the particular situation be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques unless otherwise expressly indicated.

To the extent claimed subject matter is related to one or more particular measurements, such as with regard to physical manifestations capable of being measured physically, such as, without limit, temperature, pressure, voltage, current, electromagnetic radiation, etc., it is believed that claimed subject matter does not fall with the abstract idea judicial exception to statutory subject matter. Rather, it is asserted, that physical measurements are not mental steps and, likewise, are not abstract ideas.

It is noted, nonetheless, that a typical measurement model employed is that one or more measurements may respectively comprise a sum of at least two components. Thus, for a given measurement, for example, one component may comprise a deterministic component, which in an ideal sense, may comprise a physical value (e.g., sought via one or more measurements), often in the form of one or more signals, signal samples and/or states, and one component may comprise a random component, which may have a variety of sources that may be challenging to quantify. At times, for example, lack of measurement precision may affect a given measurement. Thus, for claimed subject matter, a statistical or stochastic model may be used in addition to a deterministic model as an approach to identification and/or prediction regarding one or more measurement values that may relate to claimed subject matter.

For example, a relatively large number of measurements may be collected to better estimate a deterministic component. Likewise, if measurements vary, which may typically occur, it may be that some portion of a variance may be explained as a deterministic component, while some portion of a variance may be explained as a random component. Typically, it is desirable to have stochastic variance associated with measurements be relatively small, if feasible. That is, typically, it may be preferable to be able to account for a reasonable portion of measurement variation in a deterministic manner, rather than a stochastic matter as an aid to identification and/or predictability.

Along these lines, a variety of techniques have come into use so that one or more measurements may be processed to better estimate an underlying deterministic component, as well as to estimate potentially random components. These techniques, of course, may vary with details surrounding a given situation. Typically, however, more complex problems may involve use of more complex techniques. In this regard, as alluded to above, one or more measurements of physical manifestations may be modelled deterministically and/or stochastically. Employing a model permits collected measurements to potentially be identified and/or processed, and/or potentially permits estimation and/or prediction of an underlying deterministic component, for example, with respect to later measurements to be taken. A given estimate may not be a perfect estimate; however, in general, it is expected that on average one or more estimates may better reflect an underlying deterministic component, for example, if random components that may be included in one or more obtained measurements, are considered. Practically speaking, of course, it is desirable to be able to generate, such as through estimation approaches, a physically meaningful model of processes affecting measurements to be taken.

In some situations, however, as indicated, potential influences may be complex. Therefore, seeking to understand appropriate factors to consider may be particularly challenging. In such situations, it is, therefore, not unusual to employ heuristics with respect to generating one or more estimates. Heuristics refers to use of experience related approaches that may reflect realized processes and/or realized results, such as with respect to use of historical measurements, for example. Heuristics, for example, may be employed in situations where more analytical approaches may be overly complex and/or nearly intractable. Thus, regarding claimed subject matter, an innovative feature may include, in an example embodiment, heuristics that may be employed, for example, to estimate and/or predict one or more measurements.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be substantially present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present patent application merely provides one or more illustrative examples and claimed subject matter is intended to not be limited to one or more illustrative examples, however, again, as has always been the case with respect to the specification of a patent application, particular context of description and/or usage provides helpful guidance regarding reasonable inferences to be drawn.

The term electronic file and/or the term electronic document are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present patent application, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present patent application, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present patent application, a component is physical, but is not necessarily tangible. As an example, components with reference to an electronic document and/or electronic file, in one or more embodiments, may comprise text, for example, in the form of physical signals and/or physical states (e.g., capable of being physically displayed). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or subobjects, including attributes thereof, which, again, comprise physical signals and/or physical states (e.g., capable of being tangibly displayed). In an embodiment, digital content may comprise, for example, text, images, audio, video, and/or other types of electronic documents and/or electronic files, including portions thereof, for example.

Also, in the context of the present patent application, the term "parameters" (e.g., one or more parameters), "values" (e.g., one or more values), "symbols" (e.g., one or more symbols) "bits" (e.g., one or more bits), "elements" (e.g., one or more elements), "characters" (e.g., one or more characters), "numbers" (e.g., one or more numbers), "numerals" (e.g., one or more numerals) or "measurements" (e.g., one or more measurements) refer to material descriptive of a collection of signals, such as in one or more electronic documents and/or electronic files, and exist in the form of physical signals and/or physical states, such as memory states. For example, one or more parameters, values, symbols, bits, elements, characters, numbers, numerals or measurements, such as referring to one or more aspects of an electronic document and/or an electronic file comprising an image, may include, as examples, time of day at which an image was captured, latitude and longitude of an image capture device, such as a camera, for example, etc. In another example, one or more parameters, values, symbols, bits, elements, characters, numbers, numerals or measurements, relevant to digital content, such as digital content comprising a technical article, as an example, may include one or more authors, for example. Claimed subject matter is intended to embrace meaningful, descriptive parameters, values, symbols, bits, elements, characters, numbers, numerals or measurements in any format, so long as the one or more parameters, values, symbols, bits, elements, characters, numbers, numerals or measurements comprise physical signals and/or states, which may include, as parameter, value, symbol bits, elements, characters, numbers, numerals or measurements examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this patent application, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present patent application, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present patent application, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public. According to an embodiment, a signal packet and/or frame may comprise all or a portion of a "message" transmitted between devices. In an implementation, a message may comprise signals and/or states expressing content to be delivered to a recipient device. For example, a message may at least in part comprise a physical signal in a transmission medium that is modulated by content that is to be stored in a non-transitory storage medium at a recipient device, and subsequently processed.

In the context of the particular patent application, a network protocol, such as for communicating between devices of a network, may be characterized, at least in part, substantially in accordance with a layered description, such as the so-called Open Systems Interconnection (OSI) seven-layer type of approach and/or description. A network computing and/or communications protocol (also referred to as a network protocol) refers to a set of signaling conventions, such as for communication transmissions, for example, as may take place between and/or among devices in a network. In the context of the present patent application, the term "between" and/or similar terms are understood to include "among" if appropriate for the particular usage and vice-versa. Likewise, in the context of the present patent application, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

Figure 4:
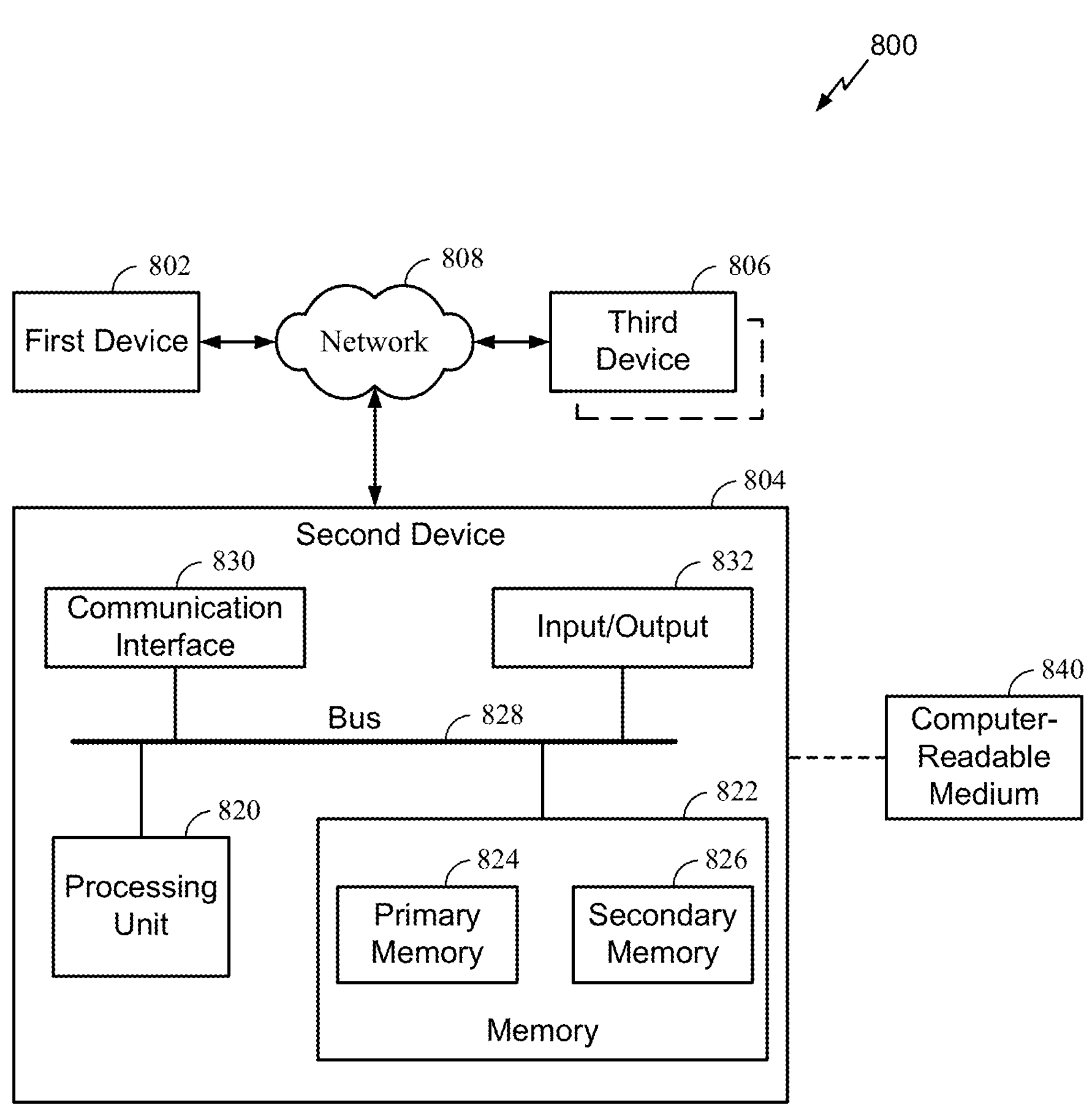
FIG. 4 is a schematic block diagram of an example computing system in accordance with an implementation.

In one example embodiment, as shown in FIG. 4, a system embodiment may comprise a local network (e.g., device 804 and medium 840) and/or another type of network, such as a computing and/or communications network. For purposes of illustration, therefore, FIG. 4 shows an embodiment 800 of a system that may be employed to implement either type or both types of networks. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 4 may comprise features, for example, of a client computing device and/or a server computing device, in an embodiment. It is further noted that the term computing device, in general, whether employed as a client and/or as a server, or otherwise, refers at least to a processor and a memory connected by a communication bus. A "processor" and/or "processing circuit" for example, is understood to connote a specific structure such as a central processing unit (CPU), digital signal processor (DSP), graphics processing unit (GPU) or neural network processing unit (NPU), or a combination thereof, of a computing device which may include a control unit and an execution unit. In an aspect, a processor and/or processing circuit may comprise a device that fetches, interprets and executes instructions to process input signals to provide output signals. As such, in the context of the present patent application at least, this is understood to refer to sufficient structure within the meaning of 35 USC § 112 (f) so that it is specifically intended that 35 USC § 112 (f) not be implicated by use of the term "computing device", "processor", "processing unit", "processing circuit" and/or similar terms; however, if it is determined, for some reason not immediately apparent, that the foregoing understanding cannot stand and that 35 USC § 112 (f), therefore, necessarily is implicated by the use of the term "computing device" and/or similar terms, then, it is intended, pursuant to that statutory section, that corresponding structure, material and/or acts for performing one or more functions be understood and be interpreted to be described at least in FIG. 1 through FIG. 3C in the text associated with the foregoing figure(s) of the present patent application.

Referring now to FIG. 4, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 4, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present patent application, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present patent application, may comprise hardware, software, firmware, or any combination thereof (other than software per se). Computing device 804, as depicted in FIG. 4, is merely one example, and claimed subject matter is not limited in scope to this particular example. FIG. 4 may further comprise a communication interface 830 which may comprise circuitry and/or devices to facilitate transmission of messages between second device 804 and first device 802 and/or third device 806 in a physical transmission medium over network 808 using one or more network communication techniques identified herein, for example. In a particular implementation, communication interface 830 may comprise a transmitter device including devices and/or circuitry to modulate a physical signal in physical transmission medium according to a particular communication format based, at least in part, on a message that is intended for receipt by one or more recipient devices. Similarly, communication interface 830 may comprise a receiver device comprising devices and/or circuitry demodulate a physical signal in a physical transmission medium to, at least in part, recover at least a portion of a message used to modulate the physical signal according to a particular communication format. In a particular implementation, communication interface may comprise a transceiver device having circuitry to implement a receiver device and transmitter device.

For one or more embodiments, a device, such as a computing device and/or networking device, may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, Internet of Things (IoT) type devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, GNSS receiver and/or other location-identifying type capability, and/or a display with a higher degree of functionality, such as a touch-sensitive color 5D or 3D display, for example.

In FIG. 4, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 4 shows various tangible, physical components, claimed subject matter is not limited to a computing device having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described. Generated signals may also be stored in memory, also previously suggested.

Memory 822 may store electronic files and/or electronic documents, such as relating to one or more users, and may also comprise a computer-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present patent application, and generally, is considered to be a self-consistent sequence of operations and/or similar signal processing leading to a desired result. In the context of the present patent application, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as “processing”, “computing”, “calculating”, “determining”, “establishing”, “obtaining”, “identifying”, “selecting”, “generating”, and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular patent application, as mentioned, the term “specific apparatus” therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 4, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors (DSPs), graphics processing units (GPUs), neural network processing units (NPUs), programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 4 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, for a device having speech to text capability, a user may speak to a device to generate input signals. A user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A first computing device comprising:

one or more communication devices;

one or more memory devices; and one or more processors coupled to the one or more memory devices to host:

one or more acting engines to execute computer-readable instructions stored on the one or more memory devices to process signals generated by one or more sensors and/or provide control signals to one or more actuators;

one or more learning engines to affect execution of at least one of the one or more acting engines in execution of computing tasks based, at least in part, on parameters stored in the one or more memory devices to affect processing, by the one or more acting engines, of the signals generated by the one or more sensors and/or affect provision, by the one or more acting engines, of control signals to the one or more actuators; and at least one agent to:

receive one or more messages from one or more peer computing devices at the one or more communication devices comprising an indication of one or more trained executable procedures, the one or more trained executable procedures having neural network weights trained by a peer computing device based, at least in part, on sensor observations obtained from one or more sensors of the peer computing device while the peer computing device was located at a current location of the first computing device; and update at least some of the parameters stored in the one or more memory devices according to a numerical metric indicative of an accuracy, memory usage, processing efficiency, reliability, speed, latency or cost effectiveness, or a combination thereof, associated with incorporation of at least one of the one or more trained executable procedures at the first computing device.

2. The first computing device of claim 1, wherein the at least one agent is further to:

interrogate at least one of the one or more peer computing devices via an exchange of messages at the one or more communication devices to obtain an indication of at least one of the one or more trained executable procedures.

3. The first computing device of claim 1, wherein the numerical metric is computed based, at least in part, on:

a comparison of at least one learning objective with current capabilities of at least one of the one or more acting engines.

4. The first computing device of claim 1, wherein the at least one of the one or more trained executable procedures comprises neural network weights and/or one or more neural network configurations accessible by at least one of the one or more peer computing devices.

5. The first computing device of claim 1, wherein the at least one agent is further to obtain the indication of the one or more trained executable procedures and compute the numerical metric responsive, at least in part, to a determination of a proximity between the first computing device and at least one of the one or more peer computing devices.

6. The first computing device of claim 1, wherein the one or more trained executable procedures are defined at least in part by one or more trained parameters that are adaptable to implement and/or augment at least one of the one or more learning engines, and wherein the agent is further to:

determine whether to execute operations to train the at least one of the one or more learning engines locally on the first computing device or on a remote server computing device based, at least in part on one or more factors.

7. The first computing device of claim 6, wherein the one or more factors are to comprise risk of breach of privacy/security via communication links or an availability of computing resources and/or training stimuli at the first computing device to execute the operations to train the at least one of the one or more learning engines locally on the first computing device, or a combination thereof.

8. The first computing device of claim 1, wherein:

augmentation of the one or more learning engines to comprise augmentation and/or implementation of one or more learning models on the first computing device; and the at least one agent is further to:

selectively fully deploy at least one of the one or more learning models responsive, at least in part, to at least one quality metric in connection with execution of the at least one of the one or more learning models.

9. The first computing device of claim 8, wherein the at least one of the one or more learning models to comprise a neural network, and wherein the at least one agent is to obtain the at least one quality metric based, at least in part, on an injection of stimulation values, sensor observations or training parameters, or a combination thereof, at one or more nodes of the neural network.

10. The first computing device of claim 1, wherein at least one of the one or more peer computing devices is to be remote from the first computing device.

11. The first computing device of claim 10, wherein the at least one agent is further to:

request, from at least one of the one or more peer computing devices, neural network weights and/or configurations tailored to and/or optimized for particular region in which the first computing device is located.

12. A method comprising:

hosting one or more acting engines on a first computing device to execute computer-readable instructions to process signals generated by one or more sensors and/or provide control signals to one or more actuators;

hosting one or more learning engines on the first computing device, the one or more learning engines to affect execution of at least one of the one or more acting engines in execution of computing tasks based, at least in part, on parameters stored in one or more memory devices;

receiving one or more messages at the first computing device from one or more second computing devices comprising an indication of one or more trained executable procedures adaptable for execution on the first computing device the one or more trained executable procedures having neural network weights trained by at least one of the one or more second computing devices based, at least in part, on sensor observations obtained from one or more sensors of the at least one of the one or more second computing devices while the at least one of the one or more second computing devices was located at a current location of the first computing device; and updating at least some of the parameters stored in the one or more memory devices according to a numerical metric indicative of an accuracy, memory usage, processing efficiency, reliability, speed, latency or cost effectiveness, or a combination thereof, associated with incorporation of at least one of the one or more trained executable procedures at the first computing device.

13. The method of claim 12, wherein the at least one of the one or more trained executable procedures is enabled, at least in part, by neural network weights and/or one or more neural network configurations accessible by at least one of the one or more second computing devices.

14. The method of claim 12, and further comprising:

interrogating at least one of the one or more second computing devices via an exchange of messages to obtain an indication of at least one of the one or more trained executable procedures.

15. A method comprising:

maintaining a configuration of computing resources for implementing one or more trained executable procedures on a first computing device, the one or more trained executable procedures having been trained by the first computing device based, at least in part on sensor observations obtained by one or more sensors of the first computing device while present at a location, the one or more trained executable procedures to execute based, at least in part, on parameters stored in one or more memory devices comprising stimulus values for training, time-domain filter coefficients or spectral-domain filter coefficients, or a combination thereof;

transmitting one or more messages from the first computing device to a second computing device that is proximate to the location, the one or more messages comprising an indication of at least one of the one or more trained executable procedures responsive to a determination at the second computing device of a proximity of the second computing device to the location; and responsive to a numeric metric indicative of an accuracy, memory usage, processing efficiency, reliability, speed, latency or cost effectiveness, or a combination thereof, associated with incorporation of at least one of the one or more trained executable procedures at the second computing device, transmitting, from the first computing device, one or more messages comprising the parameters stored in one or more memory devices comprising stimulus values for training, time-domain filter coefficients or spectral-domain filter coefficients, or a combination thereof.

16. The method of claim 15, wherein maintaining the configuration of computing resources for implementing the one or more trained executable procedures comprises maintaining neural network weights and/or configurations tailored to and/or optimized for a particular region including the location.

17. The method of claim 15, wherein the first and second computing devices are peer computing devices.

18. The method of claim 15, and further comprising:

transmitting the one or more messages to the second computing device responsive to an interrogation by the second computing device via an exchange of messages.

19. The first computing device of claim 1, wherein:

the one or more actuators comprise one or more electrical, mechanical, chemical and/or biological actuators; and the parameters stored in the one or more memory devices comprise stimulus values for training, time-domain filter coefficients or spectral-domain filter coefficients, or a combination thereof.

20. The method of claim 12, wherein:

the one or more actuators comprise one or more electrical, mechanical, chemical and/or biological actuators; and the parameters stored in the one or more memory devices comprise stimulus values for training, time-domain filter coefficients or spectral-domain filter coefficients, or a combination thereof.

* * * * *